(12) United States Patent
Dombek et al.

(10) Patent No.: US 10,801,584 B2
(45) Date of Patent: Oct. 13, 2020

(54) EQUIPMENT FOR DISASSEMBLING A PLANET CARRIER INTO TWO PARTS AND ASSOCIATED PLANET CARRIER

(71) Applicant: SAFRAN TRANSMISSION SYSTEMS, Colombes (FR)

(72) Inventors: Alexis Dombek, Moissy-Cramayel (FR); Julie Lemoine, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 56 days.

(21) Appl. No.: 16/307,799

(22) PCT Filed: Jun. 6, 2017

(86) PCT No.: PCT/FR2017/051424
§ 371 (c)(1),
(2) Date: Dec. 6, 2018

(87) PCT Pub. No.: WO2017/212165
PCT Pub. Date: Dec. 14, 2017

(65) Prior Publication Data
US 2019/0264778 A1    Aug. 29, 2019

(30) Foreign Application Priority Data
Jun. 7, 2016 (FR) ..................... 16 55200

(51) Int. Cl.
*F16H 57/08* (2006.01)
*F16H 1/28* (2006.01)
*F16H 57/00* (2012.01)

(52) U.S. Cl.
CPC ............. *F16H 1/28* (2013.01); *F16H 57/082* (2013.01); *F16H 2057/0062* (2013.01)

(58) Field of Classification Search
CPC ................. F16H 57/082; F16H 2057/0062
See application file for complete search history.

(56) References Cited

U.S. PATENT DOCUMENTS

| 5,400,506 A * | 3/1995 | Ichiki ..................... B23P 19/04 |
| | | 29/893.1 |
| 6,249,969 B1 * | 6/2001 | Komatsu ................. B23P 19/04 |
| | | 29/791 |

(Continued)

FOREIGN PATENT DOCUMENTS

| CN | 208178885 U | * 12/2018 | ............ B23P 19/027 |
| DE | 10 2010 051 942 A1 | 5/2012 | |

(Continued)

OTHER PUBLICATIONS

International Search Report for PCT/FR2017/051424 dated Apr. 12, 2018 [PCT/ISA/210].

(Continued)

*Primary Examiner* — Tisha D Lewis
(74) *Attorney, Agent, or Firm* — Sughrue Mion, PLLC

(57) ABSTRACT

Equipment for disassembling a planet carrier is provided. The planet carrier includes a cage, a cage carrier, and a connection shaft. The cage includes an inner bridge and an outer bridge. The cage carrier include a finger bar to be inserted between the inner bridge and the outer bridge. The connection shaft is housed in through-holes formed in the bridges and in the finger bar, such as to retain the cage on the cage carrier. The equipment includes a jack and a support. The jack includes a body and a piston, the piston being designed to apply a force to the connection shaft. The support is designed to bear on the finger bar when the piston applies a force to the connection shaft.

10 Claims, 5 Drawing Sheets

(56) References Cited

U.S. PATENT DOCUMENTS

2014/0031163 A1 1/2014 Coffin
2016/0298597 A1* 10/2016 Macik .................. B25B 27/026

FOREIGN PATENT DOCUMENTS

DE  10 2010 051942 A1  5/2012
WO     2014/099087 A2  6/2014

OTHER PUBLICATIONS

Preliminary Search Report issued by the French Patent Office in FR 1655200 dated Jan. 31, 2017.
International Search Report PCT/FR2017/051424 dated Apr. 9, 2018.

* cited by examiner

EQUIPMENT FOR DISASSEMBLING A PLANET CARRIER INTO TWO PARTS AND ASSOCIATED PLANET CARRIER

CROSS REFERENCE TO RELATED APPLICATIONS

This application is a National Stage of International Application No. PCT/FR2017/051424 filed Jun. 6, 2017, claiming priority based on French Patent Application No. 1655200, filed Jun. 7, 2016, the entire contents of each of which are herein incorporated by reference in their entireties.

FIELD OF THE INVENTION

The invention relates to the field of turbomachines, and more particularly reduction mechanisms of turbofans configured to introduce a reduction ratio between the speed of the fan and that of the low-pressure turbine.

TECHNICAL BACKGROUND

A turbofan generally comprises, from upstream to downstream in the gas flow direction, a ducted fan accommodated in a fan casing, an annular primary flow space and an annular secondary flow space. The mass of air aspired by the fan is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor and a high-pressure compressor, a combustion chamber, one or more turbine stages, for example a high-pressure turbine and a low-pressure turbine, and a gas exhaust nozzle.

Typically, the high-pressure turbine drives the high-pressure compressor in rotation by means of a first shaft, called the high-pressure shaft, while the low-pressure turbine drives the low-pressure compressor and the fan in rotation by means of a second shaft, called the low-pressure shaft. The low-pressure shaft is generally accommodated inside the high-pressure shaft.

In order to improve the propulsive efficiency of the turbofan and to reduce its specific fuel consumption as well as the noise emitted by the fan, turbofans having a high bypass ratio, which corresponds to the ratio between the flow rate of the primary flow (high, passing through the primary body) and the flow rate of the secondary (cold) flow. By high bypass ratio is meant here a bypass ratio greater than 10, for example comprised between 12 and 18.

To attain such bypass ratios, a reduction ratio is introduced between the speed of the fan 2 and that of the low-pressure turbine 5b, thus allowing their respective speeds of rotation to be independently optimized. This can in particular be accomplished by means of a reduction mechanism such as an epicyclic or planetary reduction mechanism, placed between the upstream end (with respect to the gas flow direction in the turbofan) of the low-pressure shaft and the fan. The fan is then driven by the low-pressure shaft by means of the reduction mechanism and an additional shaft, called the fan shaft, which is attached between the reduction mechanism and the fan disk.

The speed of rotation and the fan 2 pressure ratio are thus reduced, which allows an increase in the power extracted by the low-pressure turbine 5b.

A reduction mechanism customarily comprises:
- a sun gear, centered on the main axis of the reduction mechanism, which is driven by the low-pressure shaft (input shaft),
- a ring gear, centered on the main axis,
- planet gears, placed between the sun gear and the ring gear, the teeth of which cooperate with those of the sun gear and of the ring gear, and
- a planet carrier, on which are mounted the planet gears, generally by means of antifriction bearings.

The planet carrier can be one-piece, or as a variant be in two parts and comprises a cage and a cage carrier connected together by means of connection axles which are shrink-fit on the cage. To this end, the cage comprises a series of posts (generally five) distributed circumferentially around the axis of revolution of the cage and each including an internal saddle and an external saddle. The internal saddle and the external saddle are separated by housing adapted to receive an associated finger of the cage carrier. The internal saddle, the external saddle and the finger each comprise coaxial through openings which extend opposite when the cage is mounted on the cage carrier. In order to attach the cage on the cage carrier, a connection axle is introduced through these openings by being shrink-fit on the internal saddle and the external saddle of the cage. A ball joint is also interleaved between the connection axle and the walls of the opening formed in the finger so as to decouple the deformations of the cage carrier and of the cage.

A two-part planet carrier has the advantage of allowing misalignments of the axes of the planet gears small enough to guarantee the proper operation of the meshing. It appears, however, that the disassembly of the cage and of the cage carrier is difficult to accomplish without risk of damaging at least one of these elements. In fact, the extraction of the connection axles in order to separate the cage and the cage carrier requires an extraction force greater than 18 tonnes, which risks damaging the planet carrier. In addition, the dimensions of the planet carrier, and in particular the space available between the cage and the cage carrier, are also very small, perhaps insufficient to place there the conventional tools which are able to apply such extraction forces.

SUMMARY OF THE INVENTION

One objective of the invention is therefore to propose a tool set and a method for disassembling a two-part planet carrier of a reduction mechanism for a turbofan which allows, without damaging the planet carrier, to disassemble it simply and effectively.

In order to allow the disassembly of a planet carrier for a reduction mechanism of a turbomachine comprising:
- a cage comprising a first and a second platform connected together by at least one internal saddle and one external saddle, said internal saddle and said external saddle being separated by a housing, a first through opening being formed in the internal saddle and a second through opening being formed in the external saddle, the first through opening and the second through opening being coaxial,
- a cage carrier comprising at least one finger configured to be introduced into the housing defined between the internal saddle and the external saddle, a third through opening being formed in the finger so that when the cage is mounted on the cage carrier, the first, the second and the third through openings are coaxial, and
- a connection axle, accommodated in the first, the second and the third through openings so as to retain the cage on the cage carrier, the invention proposes a tool set comprising:

a cylinder comprising a body and a piston, the piston being configured to apply a force on the connection axle, and a support configured to be supported on the finger when the piston applies a force to the connection axle.

Certain preferred but not limiting features of the tool set are the following, taken individually or in combination:

the support comprises a first shim, configured to be placed between the external saddle and the finger while being in abutment against said finger, and a second shim configured to be placed between the internal saddle and the finger while being in abutment against said finger, the first shim comprises a substantially flat plate configured to come into contact with the finger, the second shim comprises an L-shaped plate including a first substantially flat wall configured to come into contact with the finger, and a second wall, perpendicular to the first wall and extending along the connection axle when the piston applies a force to the connection axle, the second shim also comprises a baseplate having a housing configured to receive with clearance the internal saddle when the piston applies a force to the connection axle, the first wall of the L-shaped plate being attached to the baseplate, the cylinder is configured to move the piston from the external saddle to the internal saddle, the tool set also comprising at least two anchors, extending on either side of the piston and connecting the cylinder to the support and each anchor comprises a rod comprising a first end attached to the cylinder and a second end attached to the support by means of a frame so as to take up the forces applied by the piston of the cylinder to the support during the extraction of the connection axle.

According to a second aspect, the invention also proposes a planet carrier, in particular for reduction mechanism of a turbomachine, said planet carrier comprising:

a cage comprising a first and a second platform connected together by at least one internal saddle and one external saddle, said internal saddle and said external saddle being separated by a housing, a first through opening being formed in the internal saddle and a second through opening being formed in the external saddle, the first through opening and the second through opening being coaxial, a cage carrier comprising at least one finger configured to be introduced into the housing defined between the internal saddle and the external saddle, a third through opening being formed in the finger so that when the cage is mounted on the cage carrier, the first, the second and the third through openings are coaxial, and a connection axle, accommodated in the first, the second and the third through openings so as to retain the cage on the cage carrier.

The finger of the cage carrier also comprises a first flat extending around the third opening of the finger and configured to cooperate with the support of a tool set as describe above when the piston applies a force to the connection axle of the planet carrier.

Optionally, the planet carrier also comprises a second flat extending around the second opening of the external saddle, configured to cooperate with said support of the tool set when the piston applies a force to the connection axle of said planet carrier.

BRIEF DESCRIPTION OF THE DRAWINGS

Other features, aims and advantages of the present invention will appear more clearly upon reading the detailed description which follows, and with reference to the appended drawings, given by way of non-limiting examples and in which.

DETAILED DESCRIPTION OF ONE EMBODIMENT

Figure 1:
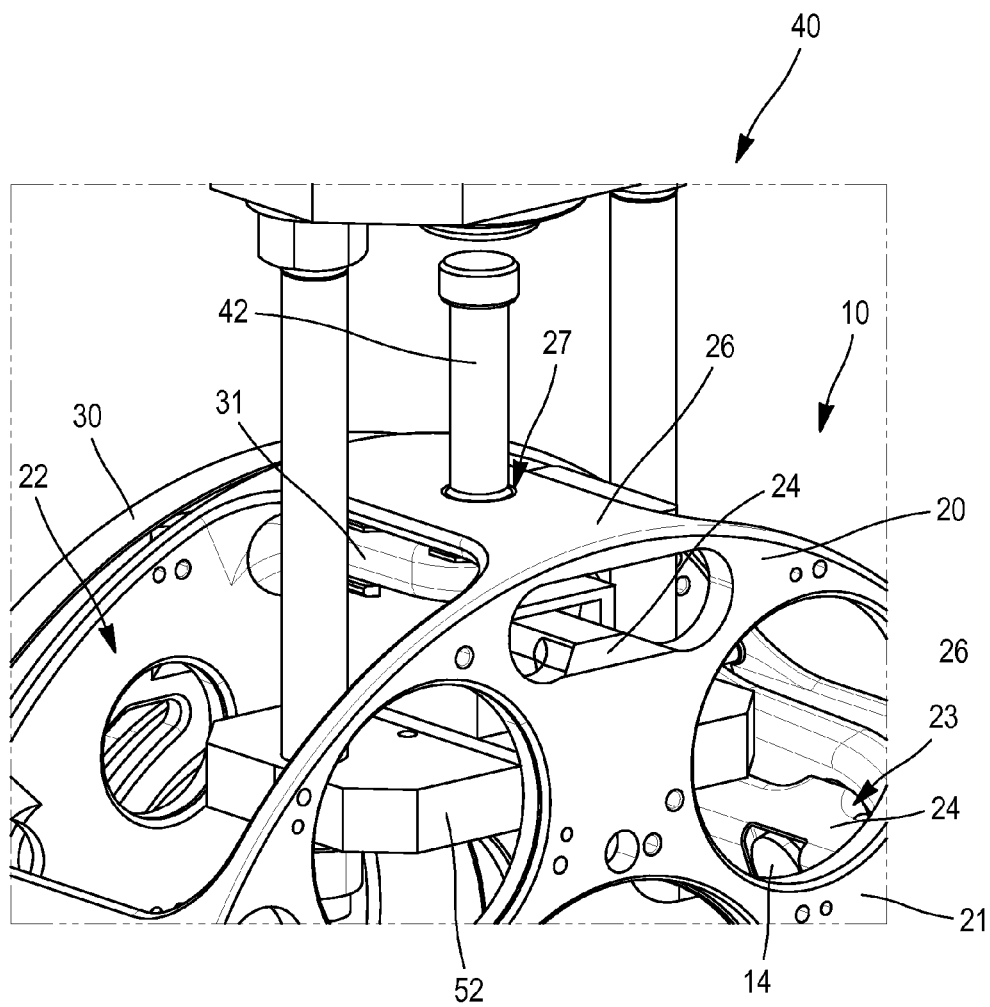
FIG. 1 is a perspective view of an exemplary embodiment of a tool set for disassembling a planet carrier conforming to the invention, the tool set being attached to the planet carrier and ready to extract a connection axle of said planet carrier.

Hereafter, the invention will be more particularly described in the context of the assembly of an epicyclic reduction mechanism comprising:

a sun gear, centered on an axis of revolution of the reduction mechanism, a ring gear, centered on the axis of revolution of the reduction mechanism, at least three planet gears configured to cooperate with the sun gear and the ring gear, five for example, and a planet carrier 10 in which the planet gears are mounted in rotation around a fixed axis, substantially parallel to the main axis X of the reduction mechanism 10.

The sun gear is configured to receive an input shaft, typically the low-pressure shaft of a turbofan.

The planet carrier 10 is in two parts and comprises to this end a cage 20 mounted on a cage carrier 30 by means of connection axles 14 which are shrink-fit on the cage.

The cage comprises a first and a second platform 21, 22, flat and substantially parallel, defining between them an internal space configured to receive the sun gear and the planet gears.

As described previously, the first and the second platform 21, 22 are attached together by means of a series of posts 23 (generally as many as there are planet gears, five for example) each comprising an internal saddle 24 and an external saddle 26 separated by a housing adapted to receive an associated finger 31 of the cage carrier 30. The internal saddle 24, the external saddle 26 and the finger 31 each comprise a through opening 25, 27 and 32, respectively, said through openings 25, 27, 32 extending opposite when the cage 20 is mounted on the cage carrier 30 and being configured to receive one of the connection axles 14. In order to attach the cage 20 to the cage carrier 30, a connection axle 14 is introduced into the three openings 25, 27, 32 by being shrink-fit on the internal saddle 24 and the external saddle 26. A ball joint 16 is also attached in the through opening 32 formed in the finger 31, the connection axle 14 passing through it with sliding adjustment so as to decouple the deformations of the cage carrier 30 and of the cage 20.

Each connection axle 14 comprises a rod configured to be accommodated in the through openings 25, 27 and 32, and a head 15 configured to be supported on an internal face of the internal saddle 24. The external diameter of the rod of the axle 14 is substantially equal to the inner diameter of the through openings 25, 27 formed in the saddles 24, 26 in order to guarantee its shrink-fit on the internal saddle 24 and on the external saddle 26. The diameter of the opening 32 formed in the finger 31 is greater, on the other hand, so as to be able to interleave the ball joint 16.

If necessary, the planet carrier 10 can also comprise a stop ring, configured to retain the connection axle 14 in case its shrink-fit is defective.

In order to allow the disassembly of such a planet carrier 10, the invention proposes a tool set 40 allowing the successive extraction of the connection axles 14 without damaging the planet carrier 10 and comprising:

a cylinder 41 comprising a body and a piston 42, the piston 42 being configured to apply a force to the connection axle 14, and a support 43 configured to be supported on the finger 31 when the piston 42 applies a force to the connection axle 14.

The support 43 allows reducing the movements of the finger 31, of the internal saddle 24 and of the external saddle 26 during the extraction of the connection axle 14 and taking up the considerable forces which are applied to the connection axle 14. This being shrink fit, it is in fact necessary that the cylinder 41 apply to it a force greater than 18 tonnes. Moreover, by being supported directly on the planet carrier 10 (and more precisely on the finger 31 of the cage carrier 30 and on the cage), the bulk of the tool set 40 is strongly limited and can be integrated into the assembly which has little space available.

The cylinder 41 is configured so as to apply a force on the connection axle 14 in a direction substantially coaxial with the openings 25, 27 and 32 of the cage 20 and of the cage carrier 30, from the exterior toward the interior (i.e. from the external saddle 26 to the internal saddle 24), the connection axle 14 comprising a head abutting against the internal face of the internal saddle 24.

The tool set 40 also comprises at least two anchors 50, extending on either side of the piston 42 and connecting the cylinder 41 to the support 43. For example, each anchor 50 can comprise a rod 51 comprising a first end, attached to the cylinder 41, and a second end, attached to the support 43 by means of a frame 52 so as to take up the forces applied by the piston 42 of the cylinder 41 on the support 43 during the extraction of the connection axle 14. The distance between the cylinder 41 and the frame 52 of the anchors 50 can be adjusted by moving the frame 52 closer or moving it away. For example, the frame 52 can comprise two through holes through which are introduced the rods 51 of the anchors 50, while the rods 51 can be threaded and comprise a nut 53 at their second end. In this manner, screwing or unscrewing the nuts 53 has the effect of moving the frame 52 closer or farther away from the first end of the rods 51.

The tool set 40 can in particular comprise a base configured to be attached to a disassembly frame. Advantageously, the cage 20 and the cage carrier 30 of the planet carrier 10 are then also attached to the disassembly frame.

Figure 2A:
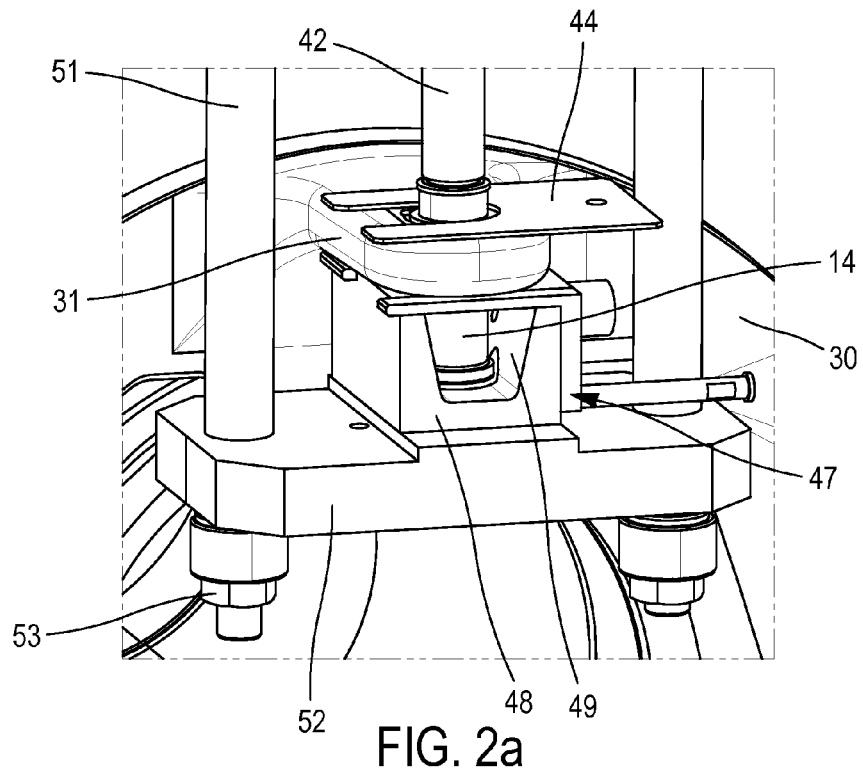
FIG. 2a is a perspective view of the tool set and of the planet carrier of FIG. 1, in which the cage of the planet carrier has been omitted.
Figure 2B:
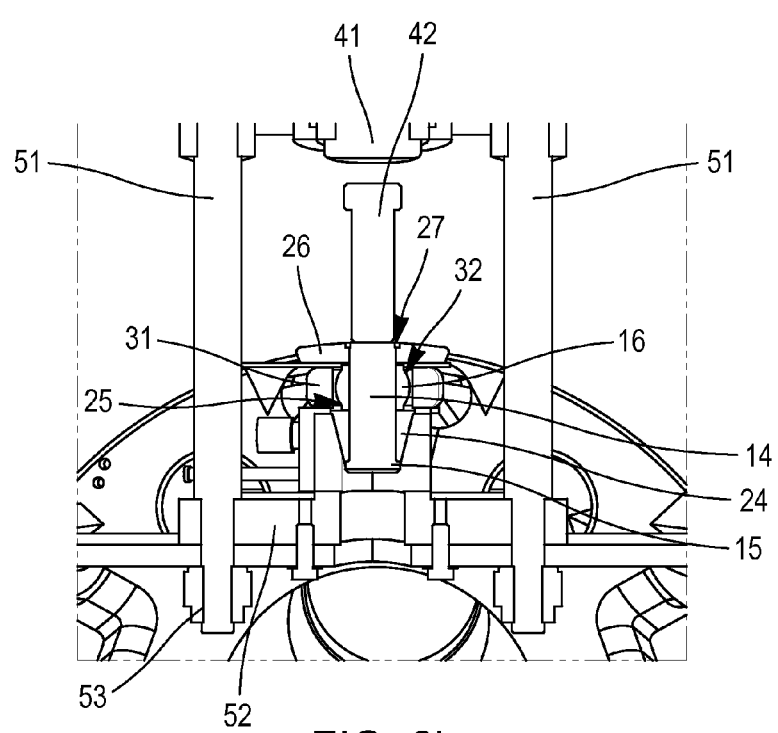
FIG. 2b is a section view of the tool set and of the planet carrier of FIG. 1.

The support 43 can comprise a first shim 44, configured to be placed between the external saddle 26 and the finger 31 while being in abutment against said finger 31, and a second shim 46 configured to be placed between the internal saddle 24 and the finger 31 while being in abutment against said finger 31 (see FIGS. 2a and 2b).

Figure 3:
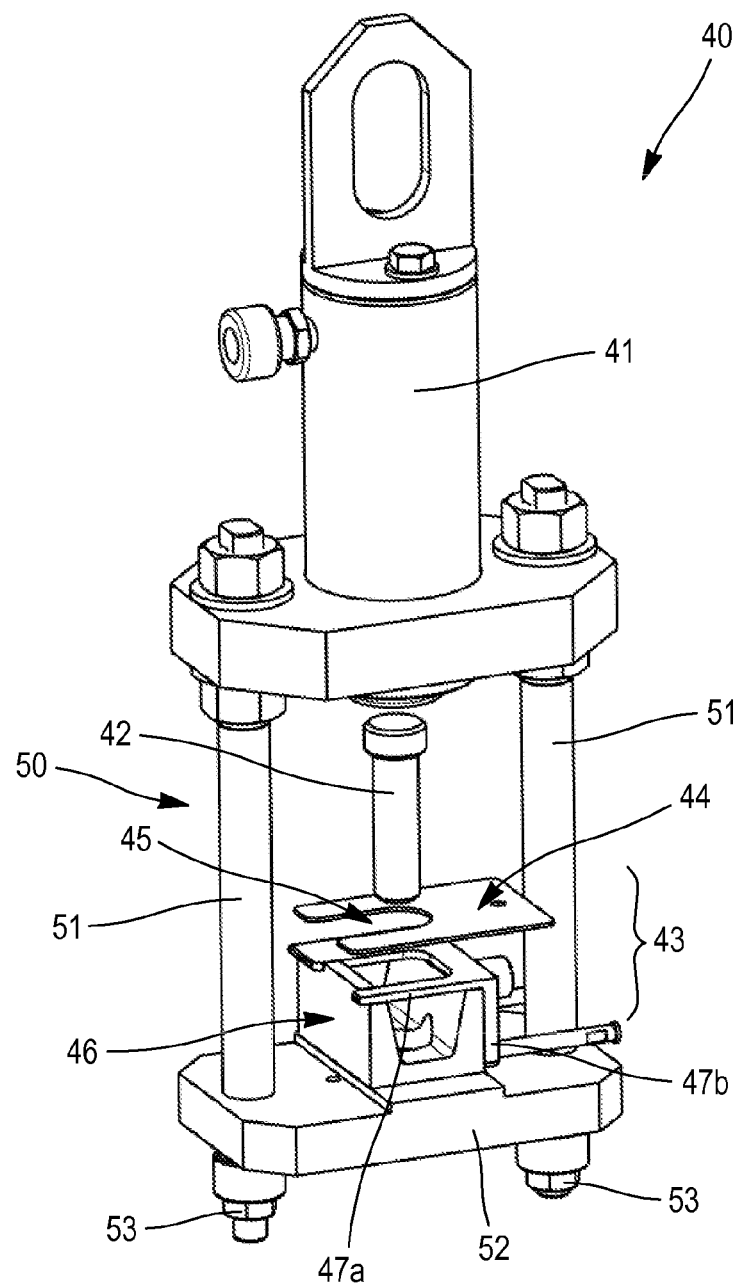
FIG. 3 is a perspective view of the tool set of FIG. 1.

The first shim 44 can in particular comprise a substantially flat plate configured to come into contact with the external face of the finger 31 which extends facing the external saddle 26 (see FIGS. 2a and 3). The plate 44 can for example be made of metal. In one embodiment, the plate 44 is attached to one of the rods 51 forming the anchors 50 of the tool set 40. Here the plate 44 is fixed with respect to this rod 51.

The plate 44 can comprise a slot 45 configured to receive with clearance the connection axle 14 and the piston 42 of the cylinder 41, so as not to interfere with the extraction of the axle. Preferably, a clearance of at least one centimeter over the entire periphery of the axle is provided.

Similarly, the second shim 46 can also comprise a substantially flat rigid plate, attached to one of the rods 51 forming the anchors 50 of the tool set 40.

As a variant, as illustrated in FIGS. 2a, 2b and 3, the second shim 46 can comprise a rigid L-shaped plate and a baseplate 48. More precisely, the L-shaped plate can be metallic and comprise a first wall 47a configured to come into contact with the finger 31 and a second wall 47b extending perpendicularly to the first wall 47a, along the connection axle 14.

For its part the baseplate 48 comprises a flat face configured to support the first wall 47a of the L-shaped plate 47 and at least one lateral wall configured to support the second wall 47b of the L-shaped plate 47. The L-shaped plate 47 and the baseplate 48 are then integral in movement. A housing 49, configured to receive with clearance the internal saddle 24 when the piston 42 applies a force to the connection axle 14, is also delimited between the flat face and the lateral wall. The first wall 47a of the L-shaped plate is then applied so as to form a support between the internal saddle 24 and the finger 31.

In one embodiment, the baseplate 48 is attached to the frame 52 of the anchors 50. The movement of the frame 52 (for the purpose of moving it close or farther away from the cylinder 41) therefore has the effect of moving the baseplate 48 and the L-shaped plate 47 of the second shim 46.

Here, the baseplate 48 has a substantially rectangular base and two substantially parallel and opposite lateral walls. The end of the lateral walls which is opposite to the base is substantially flat and forms the plat face configured to support the first wall 47a of the L-shaped plate 47. The lateral walls each have an internal face which define the housing 49. In one embodiment, the shape of the internal faces can be complementary to the shape of the internal saddle 24 designed to be received in the housing of the baseplate 48. For example, when the internal saddle 24 is substantially frusto-conical, the internal faces define a complementary frusto-conical housing 49. It will be noted, however, that the baseplate 48 is configured so that these internal faces do not come into contact with the internal saddle 24 during the extraction of the connection axle 14, so as not to create additional stresses in the cage 20.

In order to reduce the risks of damaging the cage carrier 30 and the cage 20 during extraction of the connection axle 14, the cage carrier 30 and/or the cage 20 can be reinforced locally to better take up the forces transmitted by the tool set 40.

Figure 4A:
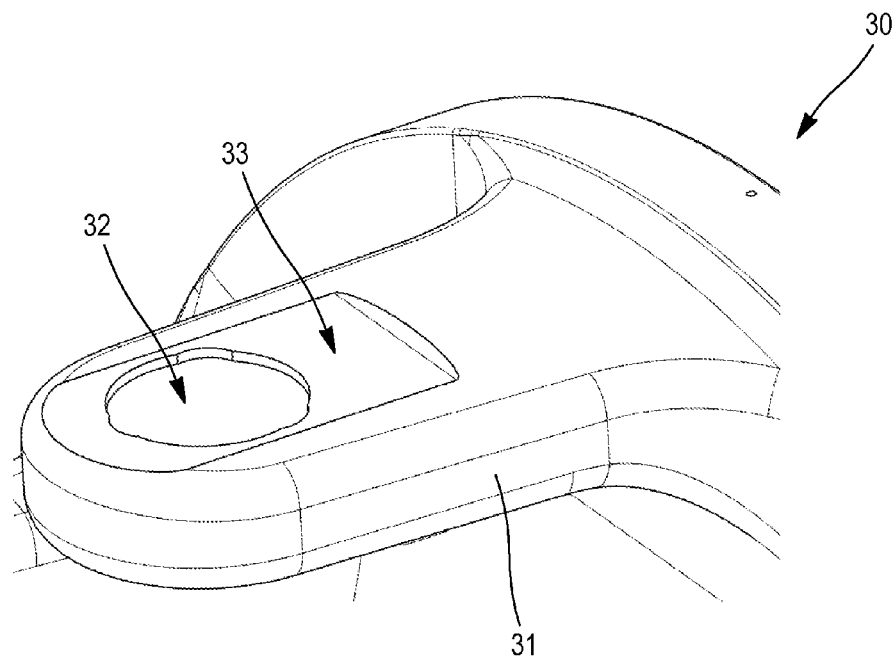
FIG. 4a is a perspective view of an exemplary embodiment of a finger of a planet carrier conforming to the invention.

In particular, as can be seen in FIG. 4a, the cage carrier 30 can comprise a first flat 33 extending around the opening 32 of the finger 31 and configured to cooperate with the support 43 of the tool set 40 when the piston applies a force to the connection axle 14 of the planet carrier 10. By flat 33 is meant here a substantially flat surface formed around the opening 32. The flat 33 thus forms a surface support capable of better distributing the forces applied by the tool set 40 via the first shim 44.

Figure 4B:
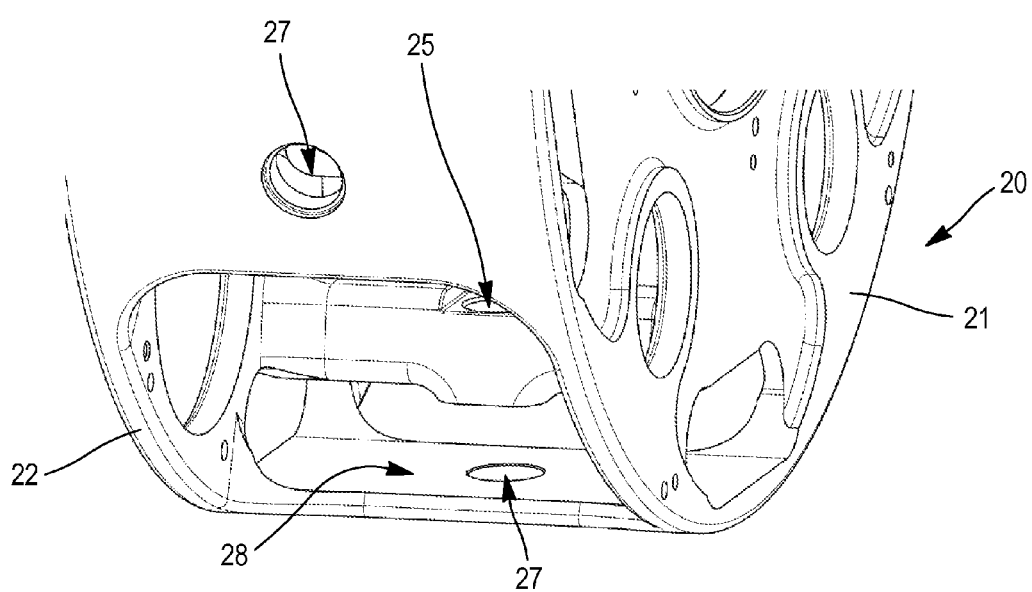
FIG. 4b is a perspective view of an exemplary embodiment of an external saddle of a cage of a planet carrier conforming to the invention.
Figure 5:
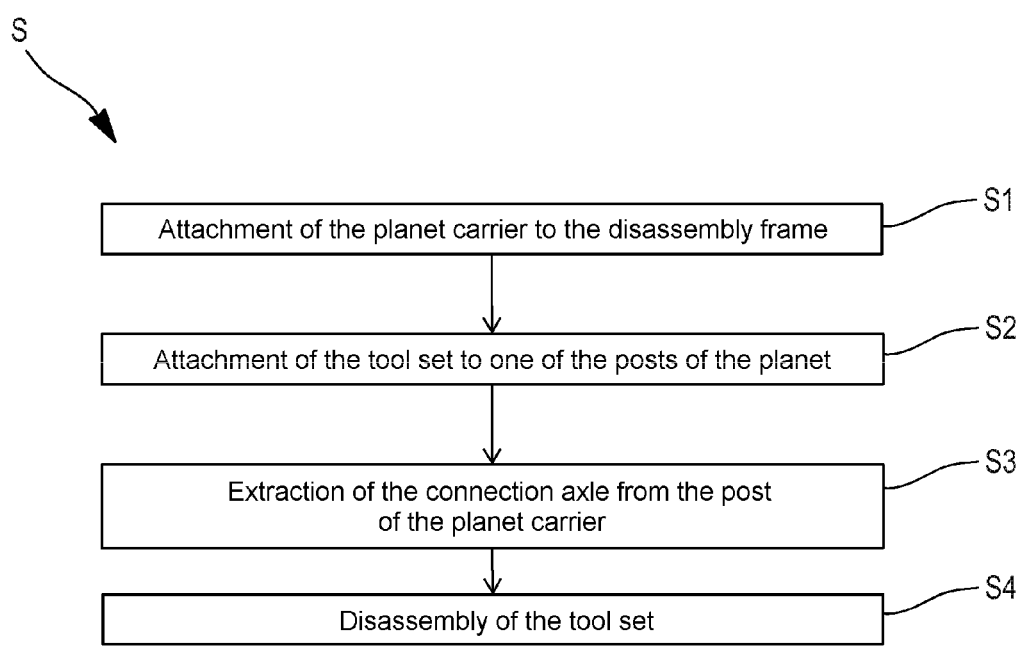
FIG. 5 is a flowchart illustrating different steps of the extraction of a connection axle of a planet carrier by means of a tool set conforming to one embodiment of the invention.

The cage 20 can also comprise a second flat 28 extending around the opening 27 formed in the external saddle 26 and configured to cooperate with the support 43 of the tool set 40 when the piston 42 applies a force to the connection axle 14 of the planet carrier 10. Here too, as can be seen in FIG. 4b, the flat 28 comprises a substantially flat surface formed around the opening 27. The flat 28 thus forms a surface support capable of better distributing the forces applied by the tool set 40 via the second shim 46.

Such flats 33, 28 can in particular be produced by milling the external surface of the finger 31 and/or of the external saddle 26.

It will be noted that, in addition to improving the surface distribution of the forces applied by the tool set 40 on the cage carrier 30 and/or the cage 20, the flats 33, 28 have the advantage of locally clearing the space available for the introduction of the tool set 40 into the planet carrier 10.

One example of the method of disassembly of a planet carrier 10 by means of a tool set 40 conforming to the invention will now be described.

During the first step S1, the planet carrier 10 can first be attached to a disassembly frame by any suitable means. If necessary, when the planet carrier 10 includes stop rings, these can be withdrawn in order to unlock the connection axles 14. As a variant, the stop rings could also be withdrawn after step S2.

During a second step S2, the tool set 40 can be brought to the planet carrier 10 and be attached in the extraction position on the disassembly frame. To this end, the tool set 40 can be attached so that:

the support 43 is placed in abutment against one of the fingers 31 of the cage carrier 30 of the planet carrier 10, and the piston 42 of the cylinder 41 is coaxial with the opening 27 formed in the external saddle 26 (which is itself coaxial with the openings 25 and 31 formed in the internal saddle 24 and the finger 31).

Thus, in the exemplary embodiment illustrated in the figures, the first shim 44 of the support 43 is inserted between the flat 28 of the external saddle 26 and the flat 33 of the finger 31 so as to come into contact with the entire surface of the flats 28, 33 and thus ensure a good distribution of the forces applied by the tool set 40.

Then, secondly, the second shim 46 is brought toward the finger 31 on the side of the internal saddle 24 by bringing the frame 52 closer to the anchors 50, for example by screwing the nuts 53 until the internal saddle 24 is received in the housing 49 of the baseplate 48 of the second shim 46 and the first wall 47a of the L-shaped plate 47 is in abutment against the finger 31. In this configuration, the tool set 40 is then flanged to the planet carrier 10 and is ready to extract the connection axle 14. It is possible in particular to refer to FIGS. 2a and 2b, which illustrate the tool set 40 in the flanged configuration. In FIG. 2b (as in FIG. 3), the cylinder is shown in an exploded view: it will of course be understood that the piston 42 is in practice integral with the cylinder 41.

During a third step S3, the cylinder 41 is then actuated so as to push the connection axle 14 from the exterior toward the interior of the planet carrier 10 in order to extract the axle 14 from the openings 25, 27 and 33 formed in the internal saddle 24, the external saddle 25 and the finger 31, respectively.

Optionally, the openings 25, 27 and 33 can be lubricated prior to extraction of the connection axle 14 so as to facilitate the disassembly and reduce the force to be applied by the tool set 40 during the step S3.

During a fourth step S4, the tool set 40 can then be disassembled. To this end, the nuts 53 can for example be unscrewed so as to move the second shim 46 away and release the internal saddle 24, the external saddle 26 and the finger 31.

The second S2, the third S3 and the fourth S4 step can then be repeated for all the posts 23 of the planet carrier 10, so as to extract successively all the connection axles 14.

When all the connection axles 14 are extracted, it is then possible to separate the cage 20 and the cage carrier 30.

The invention claimed is:

1. A tool set for disassembling a planet carrier said planet carrier comprising:
   a cage comprising a first and a second platform connected together by at least one internal saddle and one external saddle, said internal saddle and said external saddle being separated by a housing, a first through opening being formed in the internal saddle and a second through opening being formed in the external saddle, the first through opening and the second through opening being coaxial,
   a cage carrier comprising at least one finger configured to be introduced into the housing defined between the internal saddle and the external saddle, a third through opening being formed in the finger so that when the cage is mounted on the cage carrier, the first, the second and the third through openings are coaxial and
   a connection axle, accommodated in the first, the second and the third through openings so as to retain the cage on the cage carrier,
   a cylinder comprising a body and a piston, the piston being configured to apply a force to the connection axle and
   a support configured to be supported on the finger when the piston applies a force to the connection axle.

2. The tool set according to claim 1, wherein the support comprises:
   a first shim, configured to be placed between the external saddle and the finger while being in abutment against said finger, and
   a second shim configured to be placed between the internal saddle and the finger while being in abutment against said finger.

3. The tool set according to claim 2, wherein the first shim comprises a substantially flat plate configured to come into contact with the finger.

4. The tool set according to claim 2, wherein the second shim comprises an L-shaped plate including a first substantially flat wall configured to come into contact with the finger, and a second wall, perpendicular to the first wall and extending along the connection axle when the piston applies a force to the connection axle.

5. The tool set according to claim 4, wherein the second shim also comprises a baseplate having a housing configured to receive with clearance the internal saddle when the piston applies a force to the connection axle, the first wall of the L-shaped plate being attached to the baseplate.

6. The tool set according to claim 1, wherein the cylinder is configured to move the piston from the external saddle to the internal saddle.

7. The tool set according to claim 1, also comprising at least two anchors, extending on either side of the piston and connecting the cylinder to the support.

8. The tool set according to claim 7, wherein each anchor comprises a rod comprising a first end attached to the cylinder and a second end attached to the support by means of a frame so as to take up the forces applied by the piston of the cylinder to the support during the extraction of the connection axle.

9. A planet carrier, particularly for a reduction mechanism of a turbomachine, said planet carrier comprising:
- a cage comprising a first and a second platform connected together by at least one internal saddle and one external saddle, said internal saddle and said external saddle being separated by a housing, a first through opening being formed in the internal saddle and a second through opening being formed in the external saddle, the first through opening and the second through opening being coaxial,
- a cage carrier comprising at least one finger configured to be introduced into the housing defined between the internal saddle and the external saddle, a third through opening being formed in the finger so that when the cage is mounted on the cage carrier, the first, the second and the third through openings are coaxial, and
- a connection axle accommodated in the first, the second and the third through openings so as to retain the cage on the cage carrier,
wherein the finger of the cage carrier also comprises a first flat extending around the third opening of the finger, configured to cooperate with the support of a tool set according to claim 1 when the piston applies a force to the connection axle of said planet carrier.

10. The planet carrier according to claim 9, also comprising a second flat extending around the second opening of the external saddle, configured to cooperate with said support of the tool set when the piston applies a force to the connection axle of said planet carrier.

* * * * *